United States Patent [19]

Hicks et al.

[11] 4,267,817
[45] May 19, 1981

[54] WOOD-BURNING STOVE

[75] Inventors: Arthur W. Hicks, Warner, N.H.; Gerald D. Jolicoeur, P.O. Box 292, Warner, N.H. 03278

[73] Assignee: Gerald D. Jolicoeur, Belmont, N.H.

[21] Appl. No.: 889,237

[22] Filed: Mar. 23, 1978

[51] Int. Cl.³ .................................................. F24C 1/00
[52] U.S. Cl. ........................................ 126/60; 126/66; 126/77
[58] Field of Search .................. 126/83, 60, 58, 77, 126/80, 4, 289, 198, 193, 15 R, 69, 112, 117, 146, 165, 66, 61; 237/52

[56] References Cited

U.S. PATENT DOCUMENTS

| 42,935 | 5/1864 | Fares et al. | 126/289 |
|---|---|---|---|
| 82,637 | 9/1868 | Redway | 126/193 X |
| 537,136 | 4/1895 | Venable | 126/60 |
| 720,626 | 2/1903 | Schulte | 126/77 |
| 823,904 | 6/1906 | Tidick | 126/83 X |
| 938,543 | 11/1909 | Anthony | 126/77 |
| 1,280,235 | 10/1918 | Kermode | 126/58 |
| 1,819,119 | 8/1931 | Pykosz | 126/58 |
| 4,078,541 | 3/1978 | Roycraft | 126/99 R |
| 4,096,847 | 6/1978 | Mitchell | 126/66 X |
| 4,127,100 | 11/1978 | Baker | 126/66 X |
| 4,154,212 | 5/1979 | Wilkinson | 126/77 |

FOREIGN PATENT DOCUMENTS

| 561193 | 10/1923 | France | 126/65 |
|---|---|---|---|
| 589074 | 5/1925 | France | 126/58 |
| 128863 | 7/1950 | Sweden | 126/65 |

OTHER PUBLICATIONS

"Jotul, A Resource Book on the Art of Heating with Wood," Kristia Associates, Jan. 1977.

Primary Examiner—Samuel Scott
Assistant Examiner—Randall L. Green
Attorney, Agent, or Firm—Strimbeck, Davis & Soloway

[57] ABSTRACT

A wood stove is of all welded steel plate construction except for the door which is of heavy cast iron. When the door is closed, the only source of combustion air is through an adjustable air inlet on the face of the door. The door is hollow and serves to preheat the incoming air. The inner wall of the door divides the incoming air into lower and upper, primary and secondary, respectively, combustion air flows. The stove has an internal upper baffle running from rear to front which helps to promote air flow and combustion efficiency and to knock out entrained matter from the products of combustion. The flue connection is in the rear of the stove above the baffle and is stepped into the back of the stove to allow the stove to be fitted against a wall.

3 Claims, 4 Drawing Figures

WOOD-BURNING STOVE

The present invention is a wood-burning stove made entirely of welded steel plate except for a cast iron door. Except for an adjustable air inlet in the door, the stove is airtight when the door is closed to permit absolute control of the combustion process. The door has an asbestos gasket or the like to help assure airtightness.

The door has a duct with an adjustable cap over it to permit entrance and control of inlet air. The door is hollow and thus forms an air preheat chamber. The inner wall of the door has upper and lower orifices in it to direct the air flow into primary and secondary combustion air streams as they enter the firebox. The firebox is rectangular and is lined with firebrick.

An internal baffle in the top portion of the interior of the stove helps to improve combustion efficiency by directing the flow of products of combustion and helps to knock out entrained particulate matter and to trap creosote when the fire is insufficient to prevent it from liquifying in the stove. The baffle runs from the rear of the stove forward and preferably is stepped.

The vent for connecting to the flue is stepped into the back of the stove above the internal baffle to allow connection of a stovepipe while permitting the rear of the stove to seat tightly against a room wall if desired.

The top of the stove can be used for cooking and the like. A front shelf which is inherently cooler than the top is also provided which can be used to keep food warm.

The welded steel plate construction provides an exceptionally rugged stove that is relatively inexpensive as compared to other wood stove designs. All the plate is flat and the stove does not have any rolled or curvilinear sections of plate.

The whole of the design of the stove causes the wood to burn evenly from front to back and greatly increases wood economy. The inlet door is of generous size so that quite good size pieces of wood can be inserted.

DRAWING

DESCRIPTION

Figure 1:
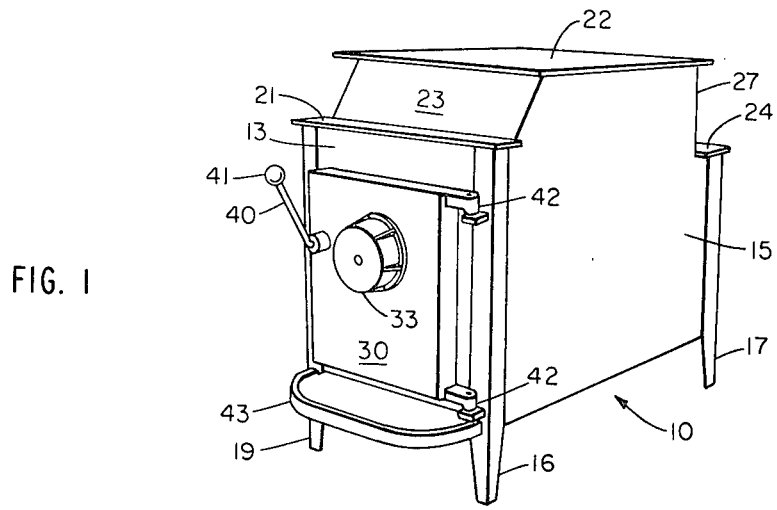
FIG. 1 is a perspective view of the stove of this invention.
Figure 2:
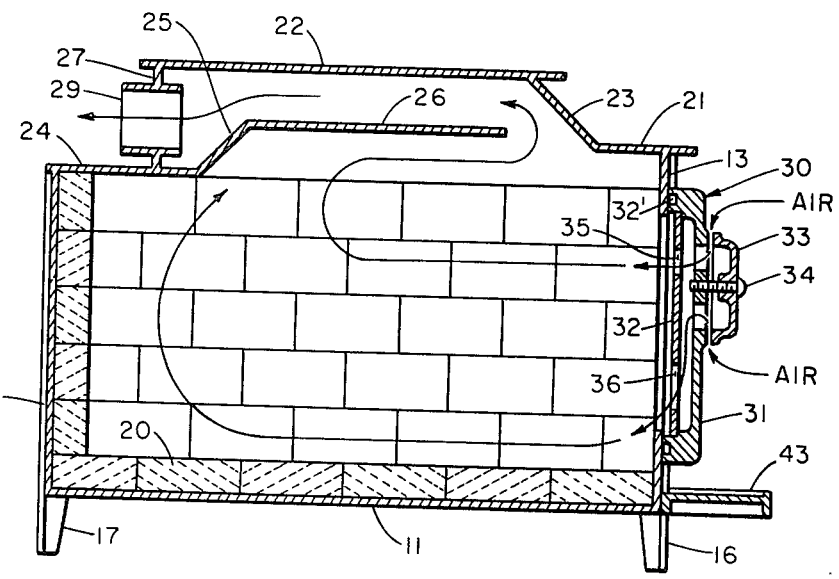
FIG. 2 is a sectional side view of the stove taken along line A—A of FIG. 3.
Figure 3:
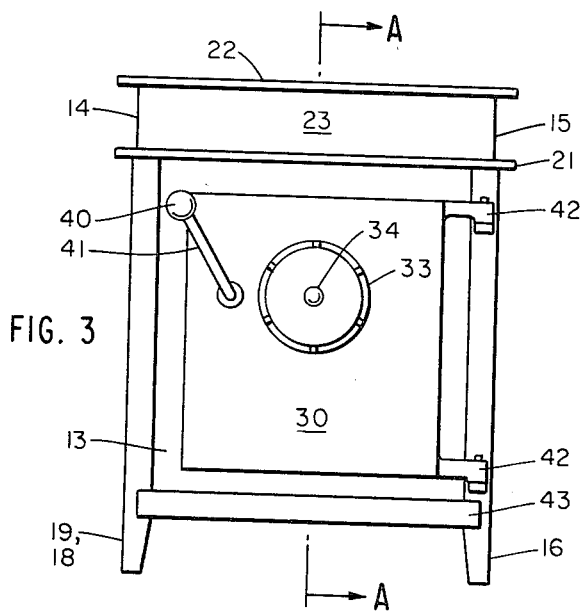
FIG. 3 is a front view of the stove.

With reference to the drawing the stove, indicated generally at 10, consists of a rectangular firebox having a bottom wall 11, a rear wall 12, a front wall 13, and two side walls 14 and 15 of flat steel plate. These sections are welded, as is the rest of steel plate used in the stove, and are joined at the vertical corner with pieces of angle iron 16, 17, 18, and 19, which pieces extend a few inches below bottom plate 11, serving as legs to support the firebox from the floor. The firebox is lined with firebrick 20.

The front wall 13 of the firebox is welded to a flat horizontal front shelf 21 and this connects to the top plate 22 by means of an angled face 23. Shelf 21 serves as a useful warming shelf and in conjunction with the angled member 23 helps direct the flow of the internal combustion air and flue gases.

An interior baffle defines the upper part of the combustion chamber. This baffle consists of a horizontal shelf 24 connecting to the rear wall 12 and to an angled plate 25. Plate 25 terminates in a horizontal flat plate 26 that is preferably at least eight inches long. Plate 26 defines a passageway for the products of combustion between the top plate 22 that is preferably no less than two inches deep. Plates 24, 25, and 26 can be formed from one continuous sheet of plate bent to the appropriate shape or can be three pieces welded together. The three plates run from side wall to side wall, i.e. from wall 14 to wall 15, and are welded thereto to form a rigid airtight construction.

Plate 24 forms a horizontal back shelf. A vertical rear plate 27 is connected to it and to the top plate 22.

Top plate 22 is welded all around to rear plate 27, the two side walls 14 and 15, and to the angled face 23. Preferably it has at least one inch overhang all around.

A flue gas connector or orifice 29 is located in the rear plate 27 as shown. Preferably the vertical distance of plate 24 from top plate 22 is at least five inches and rear plate 27 is set back at least five inches from the face of rear wall 12, such that a standard stovepipe fitting may be connected to outlet 29 without having the stovepipe come outside of the exterior dimensions of the firebox. Thus the rear of the firebox can be mounted against a wall tightly if so desired.

Figure 4:
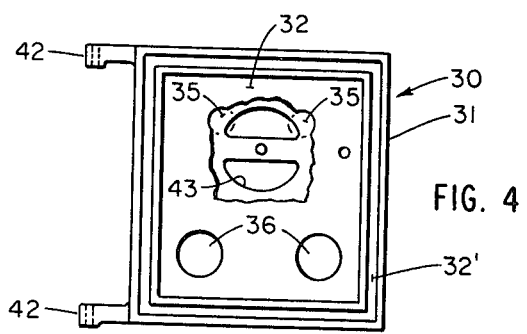
FIG. 4 is a view of the back side of the door.

A door 30 mounted to the front face 13 of the stove is of generous size to accommodate large size logs. The door consists of an outer cast iron member 31 having an inner wall or face 32 of flat plate welded therein. As cast, the inner door has a channel 32' (see FIG. 4) adapted to accommodate an asbestos packing (not shown) that extends above the level of the sides of the channel and helps assure an airtight seal when the door is closed. Attached to the outer face of the door over a rimmed opening 43 is a cast iron cap 33 which is rotatably mounted to the door by means of a threaded bolt 34, such that when the cap and bolt are rotated they open or close the gap between the cap and the door 32, depending upon the direction of rotation, thus opening or closing the inlet air passageway. The cap can be relatively tightly seated on the door such as to substantially throttle off all air flow to the firebox, tending to snuff out the fire.

The flat rear wall 32 of the door has upper 35 and lower 36 orifices cut into it to permit the passage of the incoming air into the firebox as upper (secondary) and lower (primary) air streams. Air flow into the door underneath the rotatable cap 33 as shown by the air flow arrows, flows out from underneath the cap into the preheat chamber afforded by the inner door wall and out through orifices 35 and 36 in the door. It flows through the burning material and above the burning material as shown by the air flow arrows and then out over the top of the baffle 26 through the vent or flue connection 29.

The door has a wedging type of locking handle 40 that operates against a beveled lug on the inner side of the door frame to help squeeze the asbestos gasket and assure a good airtight seal. The upper part of this handle may be weighted as shown with a ball 41 to help keep the door seated. The door is pin hinged to lugs on the frame of the firebox at 42 as illustrated.

If desired, the stove may be fitted with a cast iron apron 43 beneath the door to retain ash and other droppings that may come out of the firebox during loading.

What is claimed is:

1. A wood stove comprising: a generally rectangular firebox airtight except for a door and an exhaust pipe for products of combustion; a door having an adjustable air inlet passageway, said door being hinged to the vertical front face of said firebox and being adapted when open to admit solid fuel and when closed to admit combustion air in a regulated amount through said air inlet passageway which is the only source of combustion air when said door is closed; a baffle plate extending from the top of the rear wall of said firebox below said exhaust pipe forward towards said front face, leaving a passageway therebetween for products of combustion to flow up and over said baffle plate to said exhaust pipe; said baffle plate extending rearwardly below and beyond said exhaust pipe forming a horizontal back shelf, and a vertical rear plate set back from said rear wall and connecting said horizontal back shelf and said top, said exhaust pipe being located in said vertical rear plate and the set back of said vertical rear plate from said rear wall being sufficient to permit a right angle flue pipe to be connected to said exhaust pipe without said flue pipe intersecting the plane of said rear wall.

2. A stove for burning wood and the equivalent, comprising: a generally rectangular firebox airtight except for a door and an exhaust pipe for products of combustion; a door having an adjustable air inlet passageway, said door being hinged to the vertical front face of said firebox and being adapted when open to admit solid fuel and when closed to admit combustion air in a regulated amount, said air inlet passageway being the only source of combustion air when said door is closed; the top of said firebox consisting of a flat top plate and thereunder a baffle extending from the top of the rear wall of said firebox below said exhaust pipe forward towards said front face leaving an opening therebetween permitting products of combustion to flow up and over said baffle to said exhaust pipe; said baffle extending rearwardly below and beyond said exhaust pipe forming a horizontal shelf at least five inches below said top and said baffle angling in the interior of said stove upwardly but leaving a passageway beneath said flat top plate having a minimum straight horizontal run of at least eight inches and a minimum depth of two inches between said baffle and said flat top plate, and said baffle extending from side wall to side wall of said firebox and making an airtight connection therewith; and a vertical rear plate set back from said rear wall and connecting said horizontal back shelf of said baffle and said top, said exhaust pipe being located in said vertical rear plate and the set back of said vertical rear plate from said rear wall being sufficient to permit a right angle flue pipe to be connected to said exhaust pipe without said flue pipe intersecting the plane of said rear wall, and said stove except for said door consisting of pieces of flat steel plate welded together.

3. The stove of claim 2 having attached angle iron corners along the four vertical edges of said firebox which angle iron corners end downwardly in legs supporting said firebox from the floor.

* * * * *